(12) United States Patent
Fukai

(10) Patent No.: US 6,543,895 B2
(45) Date of Patent: Apr. 8, 2003

(54) FRAME FOR EYEGLASSES

(76) Inventor: Seiji Fukai, 10-28, Koshigoe 1-chome, Kamakura-shi, Kanagawa 248-0033 (JP)

(*) Notice: Subject to any disclaimer, the term of this patent is extended or adjusted under 35 U.S.C. 154(b) by 0 days.

(21) Appl. No.: 09/908,797

(22) Filed: Jul. 20, 2001

(65) Prior Publication Data

US 2002/0021405 A1 Feb. 21, 2002

(30) Foreign Application Priority Data

Jul. 28, 2000 (JP) ........................................ 2000-229297

(51) Int. Cl.⁷ ................................................ G02C 5/14
(52) U.S. Cl. ............................ 351/112; 24/3.3; 24/3.11; 24/3.12
(58) Field of Search ................................ 351/112, 111, 351/113, 121, 123; 24/3.12, 3.11, 3.3

(56) References Cited

U.S. PATENT DOCUMENTS

| | | |
|---|---|---|
| 1,779,015 A | 10/1930 | Schmitt |
| 1,898,059 A | 2/1933 | McDonald |
| 1,973,648 A | 9/1934 | Nagel ............................ 88/41 |
| 2,042,400 A | 5/1936 | Hon ............................... 88/41 |
| 2,097,371 A | 10/1937 | Hon ............................... 88/52 |
| 3,210,814 A | 10/1965 | Wolf .............................. 24/3 |
| 3,883,236 A | 5/1975 | Zipper ......................... 351/112 |
| 5,278,591 A | 1/1994 | Trotter ........................ 351/112 |
| 6,017,120 A | 1/2000 | McCormick ................. 351/112 |
| 6,029,319 A * | 2/2000 | Challender .................... 24/3.3 |
| 6,045,221 A | 4/2000 | Resendez .................... 351/112 |
| 6,059,410 A | 5/2000 | Wang .......................... 351/112 |

* cited by examiner

Primary Examiner—Hung Xuan Dang
(74) Attorney, Agent, or Firm—Michael Tobias

(57) ABSTRACT

A frame for eyeglasses has a clip for grasping a shirt pocket mounted on a lateral surface of one or both temple pieces of the frame. The clip may open and close by flexing, or by pivoting of the clip with respect to the temple piece on which it is mounted.

16 Claims, 10 Drawing Sheets

FIG. 22
FIG. 23
FIG. 24
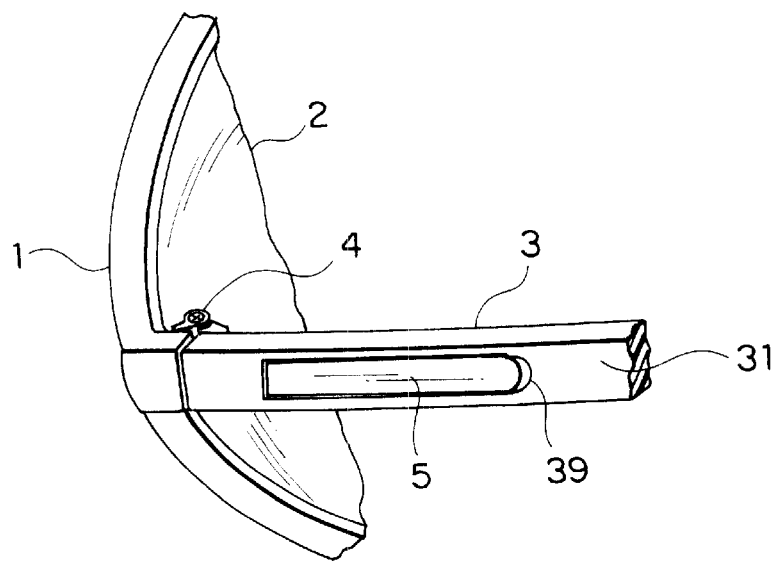
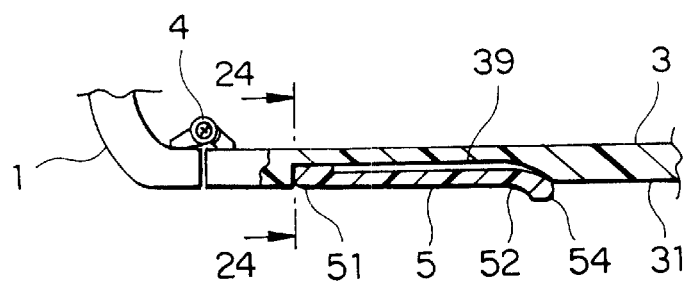
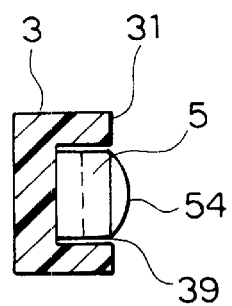

FRAME FOR EYEGLASSES

REFERENCE TO RELATED APPLICATIONS

This application is based on Japanese Patent Application No. 2000-229297, filed in Japan on Jul. 28, 2000, the contents of which are hereby incorporated by reference.

BACKGROUND OF THE INVENTION

1. Field of the Invention

This invention relates to a frame for eyeglasses which enables the eyeglasses to be firmly attached to a pocket or other portion of an item of apparel.

2. Description of the Related Art

Eyeglasses are frequently purchased together with a protective case in which the eyeglasses can be housed when not in use. However, many users find it inconvenient to carry the case around with them or to have to locate the case and place the eyeglasses into the case whenever the eyeglasses are not being used. Therefore, it is extremely common for users of eyeglasses to place them into a breast pocket of a shirt, a jacket, or other item of apparel when the eyeglasses are not being worn. The frames of eyeglasses are typically made of a very smooth material, so it is very easy for eyeglasses to slip out of a breast pocket of an item of apparel when the wearer leans over or removes the apparel, and the eyeglasses can easily fall to the ground and become dirty, damaged, lost, or destroyed.

SUMMARY OF THE INVENTION

The present invention provides a frame for eyeglasses which enables the eyeglasses to be placed in a breast pocket of a shirt, a jacket, or other item of apparel when not in use without danger of the eyeglasses falling out of the pocket.

A frame for eyeglasses according to the present invention includes a pair of temple pieces and a clip attached to a lateral surface of at least one of the temple pieces. The clip can grasp the front of a pocket or other portion of an item of apparel to secure the frame to the item of apparel and prevent the eyeglasses from falling to the ground.

The clip may have a variety of structures. In a number of preferred embodiments, the clip is a flexible member which can elastically flex with respect to the temple piece on which it is mounted between an open and a closed position. In other preferred embodiments, the clip is pivotably mounted on a temple piece and can pivot between an open and a closed position.

A frame for eyeglasses according to the present invention may have a clip provided on either the inner lateral surface or the outer lateral surface of either temple piece.

A frame for eyeglasses according to the present invention is not restricted to use with any particular type of eyeglasses. For example, it may be used in eyeglasses with corrective lenses, in sunglasses, or in safety glasses for protecting the eyes against injury. Thus, the type of lenses which are mounted on the frame of the eyeglasses is not important.

BRIEF DESCRIPTION OF THE DRAWINGS

FIG. 22 is a perspective view of a portion of a pair of eyeglasses equipped with another embodiment of a frame according to the present invention.

FIG. 23 is a cutaway plan view of the front end of the left temple piece of the embodiment of FIG. 22.

FIG. 24 is a cross-sectional view taken along line 24—24 of FIG. 23.

DESCRIPTION OF PREFERRED EMBODIMENTS

Figure 1:
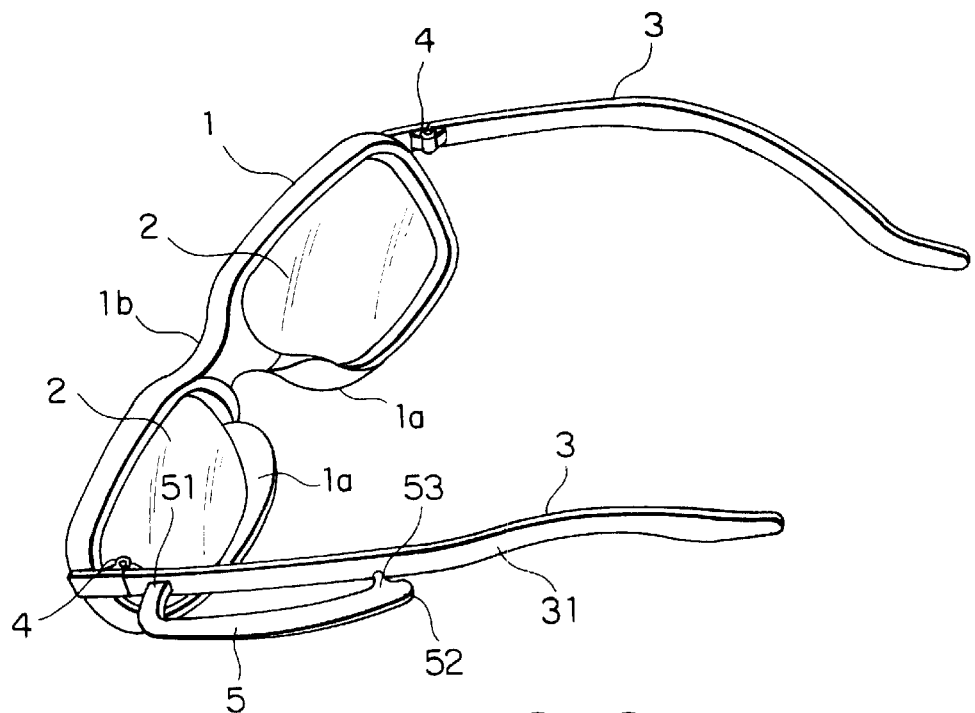
FIG. 1 is a perspective view of a pair of eyeglasses equipped with an embodiment of a frame according to the present invention.

A number of preferred embodiments of a frame for eyeglasses according to the present invention will be described while referring to the accompanying drawings. FIG. 1 is a schematic perspective view of a pair of eyeglasses equipped with a first embodiment of a frame for eyeglasses. The frame for eyeglasses includes a lens frame 1 which is shown equipped with two lenses 2. The lens frame 1 may be of any desired structure, such as a conventional structure. It will typically include nose rests 1a which rest on the sides of the nose of a wearer and a bridge 1b extending between the left and right sides of the lens frame 1. The frame further includes left and right temple pieces 3 each having a front end pivotably connected to the lens frame 1 by a hinge 4 and a rear end which rests on an ear of the wearer. The hinges 4 enable the temple pieces 3 to be folded against the lens frame 1 when the eyeglasses are not in use. The lens frame 1 is schematically illustrated as being a one-piece member between the two hinges 4 which connect it to the hinges 4, but it may instead comprise a plurality of components either permanently or detachably connected to each other, as is common in frames for eyeglasses. The shapes of the lens frame 1 and the temple pieces 3 are not restricted and may be selected in accordance with the intended use and desired appearance of the eyeglasses.

A clip 5 by means of which the eyeglasses can be attached to a pocket or other portion of an item of apparel is mounted on the outer lateral surface 31 of one of the temple pieces 3. The clip 5 is shown mounted on the left temple piece 3, but it can instead be mounted on the right temple piece 3 or on both temple pieces 3. The clip 5 has a front end 51 which is secured to the outer lateral surface 31 of the left temple piece 3 and a rear end 52 which is capable of lateral movement relative to the outer lateral surface 31 by flexing of the clip 5 and/or of the left temple piece 3 to enable a portion of a pocket or other item of apparel to be inserted between the rear end 52 of the clip 5 and the outer lateral surface 31 of the temple piece 3.

The clip 5 is not restricted to any particular shape. In the present embodiment, it is roughly L-shaped, with the shorter leg of the L secured to and projecting from the outer lateral surface 31 of the left temple piece 3 and the longer leg of the L extending along the left temple piece 3 towards the rear end thereof. The length of the clip 5 is not critical, but it is preferably sufficiently short that it will not contact the ear of a wearer of the eyeglasses. The width of the clip 5 is also not critical, although to reduce the chances of the clip 5 inadvertently catching on objects and to improve its appearance, it may be desirable if the width of the clip 5 is no greater than the width of the temple piece 3 on which the clip 5 is mounted.

The clip 5 and/or the left temple piece 3 have sufficient elasticity to enable the clip 5 and/or the left temple piece 3 to elastically deform by flexing to enable the rear end 52 of the clip 5 to move away from the outer lateral surface 31 of the left temple piece 3 when a member, such as the edge of a pocket of a shirt or other item of apparel, is inserted between the rear end 52 of the clip 5 and the outer lateral surface 31 of the temple piece 3 and then to grip the member between them. Thus, the clip 5 may have a smaller bending stiffness, the same bending stiffness, or a greater bending stiffness than the left temple piece 3, depending upon whether it is desired for the clip 5, the temple piece 3, or both to bend when a member is being inserted between them. The rear end 52 of the clip 5 may be equipped with a projection 53 or other structure to reduce slipping between the rear end 52 and a pocket or other member disposed between the clip 5 and the left temple piece 3.

The clip 5 is not restricted to any particular material, and it may be made of the same or different material forming the temple piece 3 on which it is mounted. For example, the clip 5 may be made of a metal or a plastic. The clip 5 may be secured to the temple piece 3 in any desired manner, either permanently or removably. The clip 5 and the left temple piece 3 may be separate members which are secured to each other after being separately manufactured, or they may be integrally formed with each other.

Figure 2:
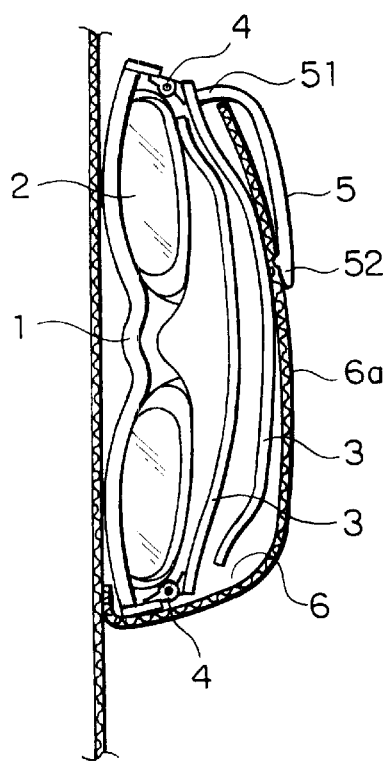
FIG. 2 is a cross-sectional side elevation of a pair of eyeglasses equipped with a variation of the embodiment of FIG. 1 disposed in a shirt pocket.
Figure 3:
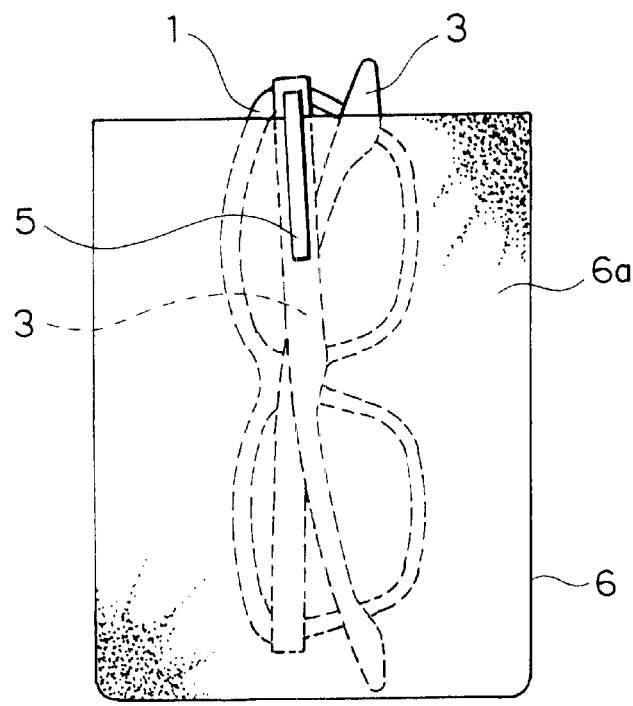
FIG. 3 is a front elevation of the eyeglasses of FIG. 2 disposed in a shirt pocket.

FIGS. 2 and 3 are respectively a partially cross-sectional side elevation and a front elevation of a pair of eyeglasses having a frame according to the present invention disposed in a pocket 6 of a shirt or other item of apparel. The eyeglasses in this drawing are similar to the pair shown in FIG. 1, the only difference being that a clip 5 having the structure shown in FIG. 1 is mounted on the right temple piece 3 of the frame of the eyeglasses instead of on the left temple piece 3. When the eyeglasses have been folded up with the right temple piece 3 on which the clip 5 is mounted on top of the left temple piece 3, the eyeglasses are inserted into the pocket 6 with the lens frame 1 facing the breast of the wearer (to the left in FIG. 2) and with the temple pieces 3 facing towards the outer wall 6a of the pocket 6. With the eyeglasses oriented in this manner, as they are being inserted into the pocket 6, the upper end of the outer wall 6a of the pocket 6 can be slipped between the outer lateral surface 31 of the right temple piece 3 and the clip 5, which ends up being disposed on the exterior of the pocket 6, and the outer wall 6a of the pocket 6 is gripped between the clip 5 and the right temple piece 3. The clip 5 thereby prevents the eyeglasses from falling out of the pocket 6 due to the force of gravity and being damaged when the wearer of the item of apparel having the pocket 6 leans over or sets the item of apparel down.

Figure 4:
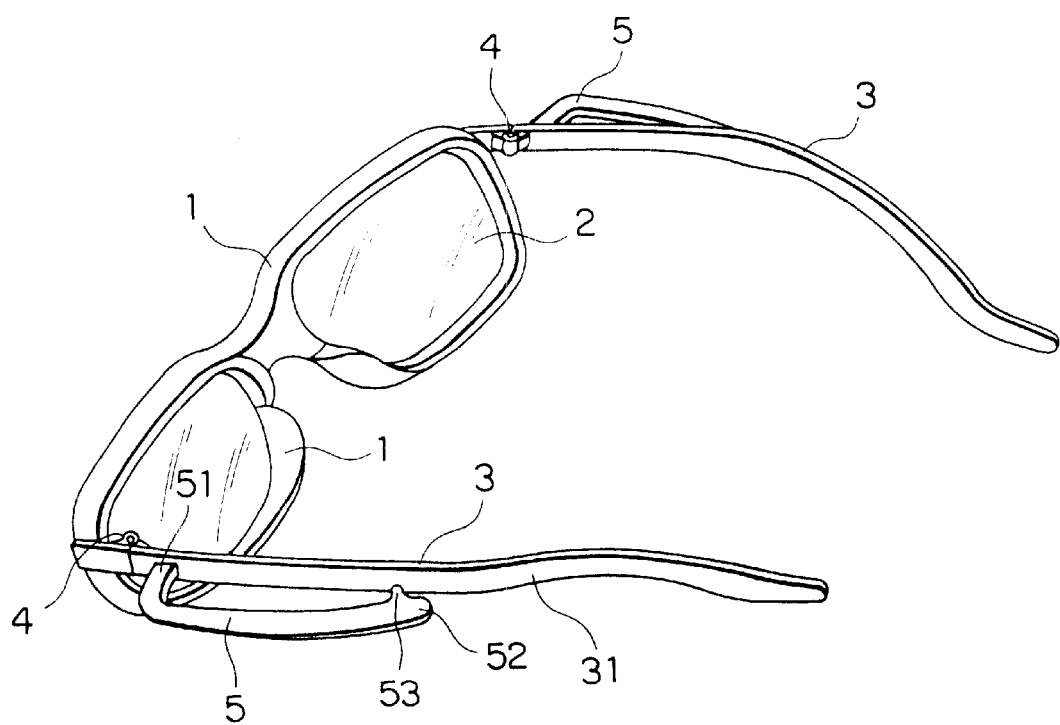
FIG. 4 is a perspective view of a pair of eyeglasses equipped with another embodiment of a frame according to the present invention having a clip on each temple piece.

FIG. 4 is a perspective view of a pair of eyeglasses equipped with another embodiment of a frame for eyeglasses according to the present invention. In this embodiment, a clip 5 like that shown in FIG. 1 is provided on both the right temple piece 3 and the left temple piece 3 of the frame. With this structure, the wearer of the eyeglasses does not need to concern himself with which temple piece 3 is on top of the other one when he folds up the eyeglasses or with whether the left or right side of the eyeglasses is higher when the eyeglasses are inserted into a pocket. As long as the wearer places the eyeglasses in his pocket with the lens frame 1 facing towards his breast and the temple pieces 3 facing away, one of the clips 5 will be in a position such that it can grasp the upper edge of the outer wall 6a of the pocket 6.

Figure 5:
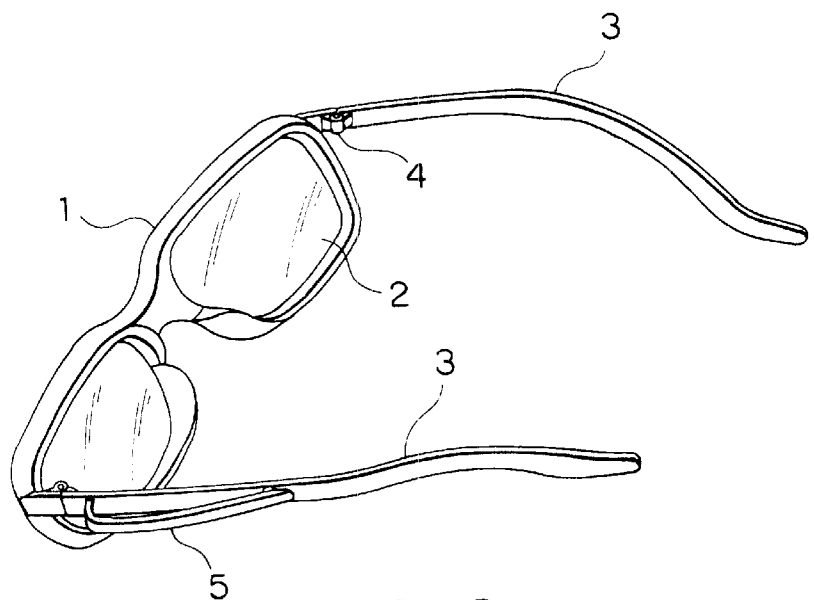
FIGS. 5 and 6 are perspective views of eyeglasses equipped with variations of the embodiment of FIG. 1 showing different types of clips which can be employed on a temple piece.

The clip 5 of a frame according to the present invention may have a variety of cross-sectional shapes. FIG. 5 illustrates a pair of eyeglasses equipped with an embodiment of a frame according to the present invention in which the clip 5 has a rectangular transverse cross-sectional shape with a width which is greater than its thickness. By making the width greater than the thickness, the amount by which the clip 5 protrudes from the outer lateral surface 31 of the temple piece 3 on which it is mounted and the overall size of the frame can be reduced.

Figure 6:
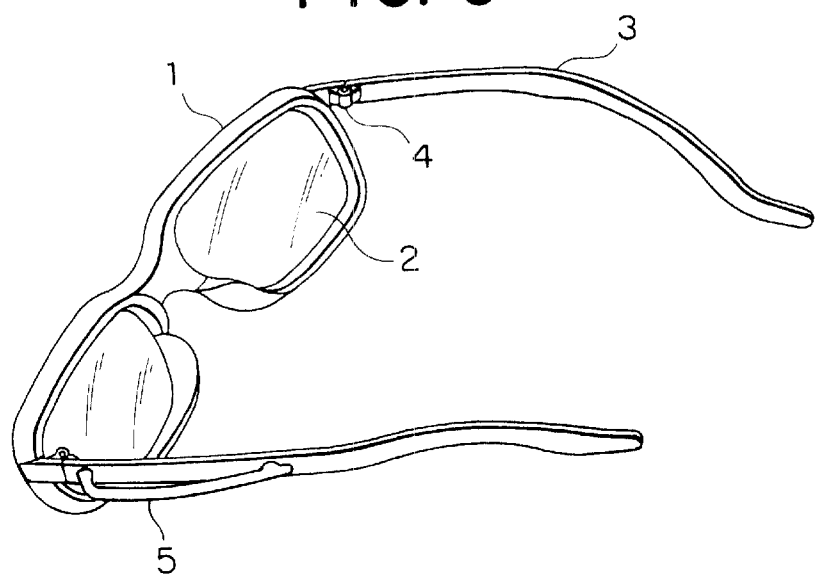

FIG. 6 illustrates a pair of eyeglasses equipped with an embodiment of a frame according to the present invention in which the clip 5 has a curved transverse cross-sectional shape, such as one which is circular or elliptical. When the transverse cross-sectional shape is elliptical, the major axis of the ellipse preferably extends substantially parallel to the outer lateral surface 31, i.e., in the height direction of the temple piece 3.

Many other cross-sectional shapes can be employed for the clip 5, depending upon the desired appearance of the eyeglasses.

Figure 7:
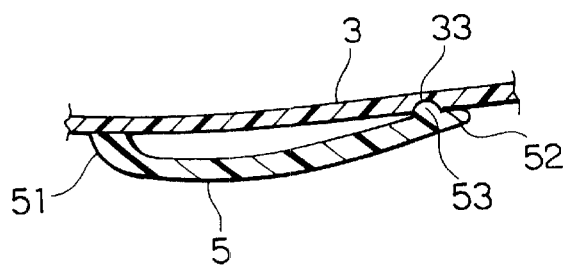
FIG. 7 is a longitudinal cross-sectional view of a temple piece of another embodiment of the present invention.

In order to reduce the obtrusiveness of the clip 5, it is possible to dispose all or a portion of the clip 5 within a recess in the temple piece 3 on which the clip 5 is mounted. FIG. 7 is a longitudinal cross-sectional view of a portion of a left temple piece 3 and a clip 5 of another embodiment of the present invention in which the projection 53 on the rear end 52 of the clip 5 is received in a recess 33 formed in the outer lateral surface 31 of the left temple piece 3 on which the clip 5 is mounted. Disposing the projection 53 in the recess 33 reduces the amount by which the clip 5 as a whole protrudes from the outer lateral surface 31 of the temple piece 3, and it reduces the tendency for the rear end 52 of the clip 5 to inadvertently catch on objects.

Figure 8:
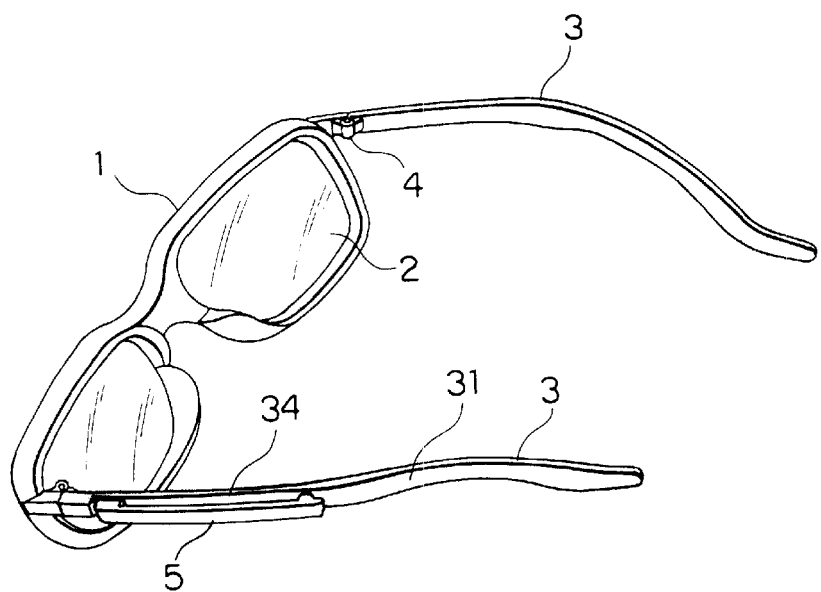
FIG. 8 is a perspective view of a pair of eyeglasses equipped with another embodiment of a frame according to the present invention.
Figure 9:
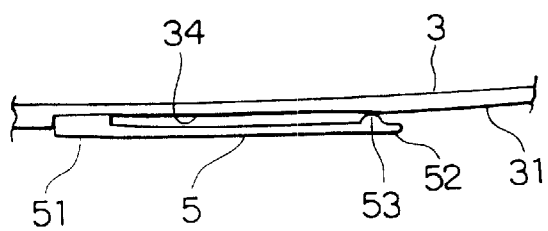
FIG. 9 is a plan view of a portion of the left temple piece and the clip of the embodiment of FIG. 8.

FIG. 8 is a perspective view of a pair of eyeglass equipped with another embodiment of a frame according to the present invention, and FIG. 9 is an enlarged top view of a portion of the left temple piece 3 of this embodiment. In this embodiment, the clip 5 is received over its entire length in an elongated recess 34 formed in the outer lateral surface 31 of the left temple piece 3. Depending upon the depth of the recess 34, the outer lateral surface of the clip 5 may project outwards from, be flush with, or be recessed with respect to the portion of the outer lateral surface 31 of the temple piece 3 outside of and adjoining the recess 34. Disposing the clip 5 in a recess 34 over the entire length of the clip 5 further decreases the tendency for the clip 5 to inadvertently catch on objects, it decreases the overall size of the frame, and it makes the clip 5 less visibly obtrusive.

Figure 10:
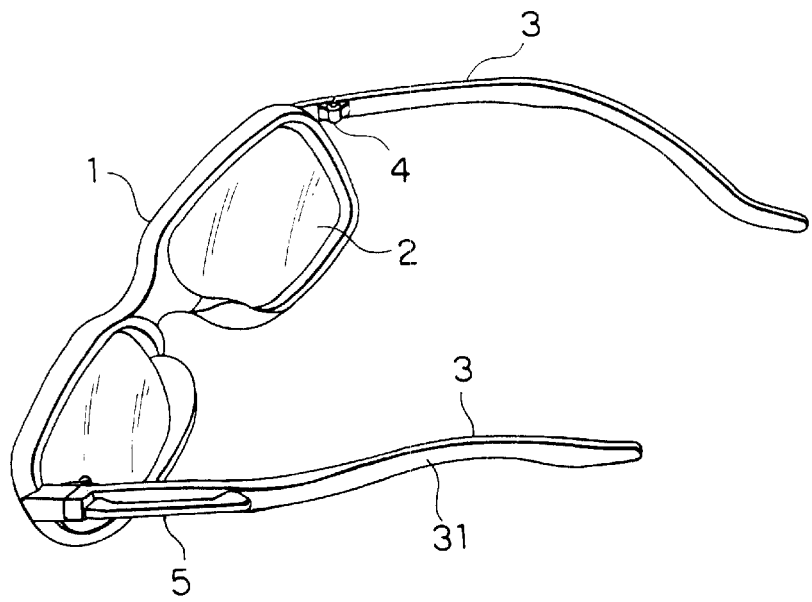
FIG. 10 is a perspective view of a pair of eyeglasses equipped with a modification of the embodiment of FIG. 8.

In FIG. 8, the clip 5 is shown as having substantially the same width as the left temple piece 3, but the width of the clip 5 is not critical. For example, as shown in FIG. 10, the width of the clip 5 may be less than the width of the temple piece 3 on which the clip 5 is mounted to decrease the space occupied by the clip 5. The shape of the clip 5 is also not restricted to that shown in FIG. 8.

Figure 11:
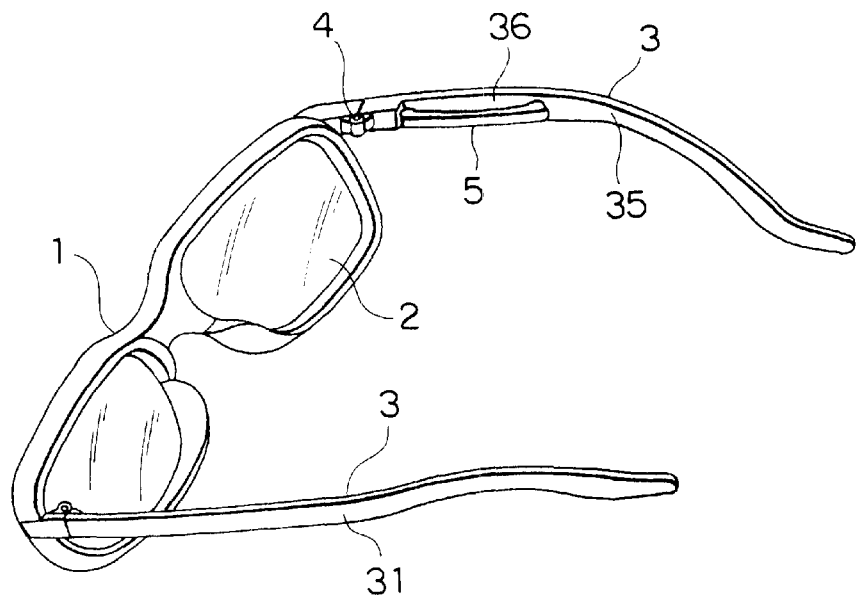
FIG. 11 is a perspective view of a pair of eyeglasses equipped with another embodiment of a frame according to the present invention having a clip on the inner lateral surface of a temple piece.

FIG. 11 is a perspective view of a pair of eyeglasses equipped with another embodiment of a frame for eyeglasses according to the present invention in which a clip 5 is mounted on the inner lateral surface 35 of a temple piece 3. FIG. 11 shows a clip 5 mounted on only the right temple piece 3, but a clip 5 may be instead mounted on the left temple piece 3 or on both the right and the left temple piece 3. The clip 5 may have the structure of any of the clips 5 employed in the preceding embodiments. To prevent the clip 5 from causing any irritation to the wearer of the eyeglasses, the clip 5 is preferably disposed over at least a portion of its length in a recess 36 formed on the inner lateral surface 35 of the temple piece 3 so as to project from the inner lateral surface 35 towards the side of the wearer's head by its little as possible. For example, the outer lateral surface of the clip 5 may be flush with or recessed beneath the portion of the inner lateral surface 35 of the temple piece 3 outside and adjoining the recess 36 so that the wearer does not feel the clip 5. In the illustrated example, the recess 36 extends over the entire length of the clip 5, like the recess 34 shown in FIG. 9.

Figure 12:
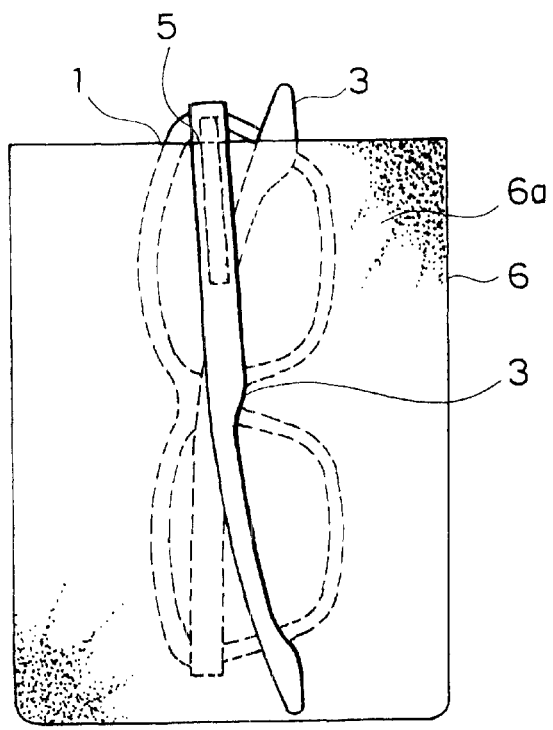
FIG. 12 is a front elevation of the eyeglasses of FIG. 11 disposed in a shirt pocket.

FIG. 12 is a schematic front elevation of the embodiment of FIG. 11 disposed in a breast pocket 6 of a shirt or other item of apparel. The eyeglasses are folded up and inserted into the pocket with the lens frame 1 facing the breast of the wearer, with the temple piece 3 on which the clip 5 is mounted folded over the other temple piece 3 and disposed on the outside of the pocket 6, and with the remainder of the frame disposed on the inside of the pocket 6. As the eyeglasses are inserted into the pocket 6, the upper edge of the outer wall 6a of the pocket 6 can be slipped between the clip 5 and the inner lateral surface 35 of the right temple piece 3 and be gripped therebetween, whereby the eyeglasses can be prevented from falling out of the pocket 6.

Figure 13:
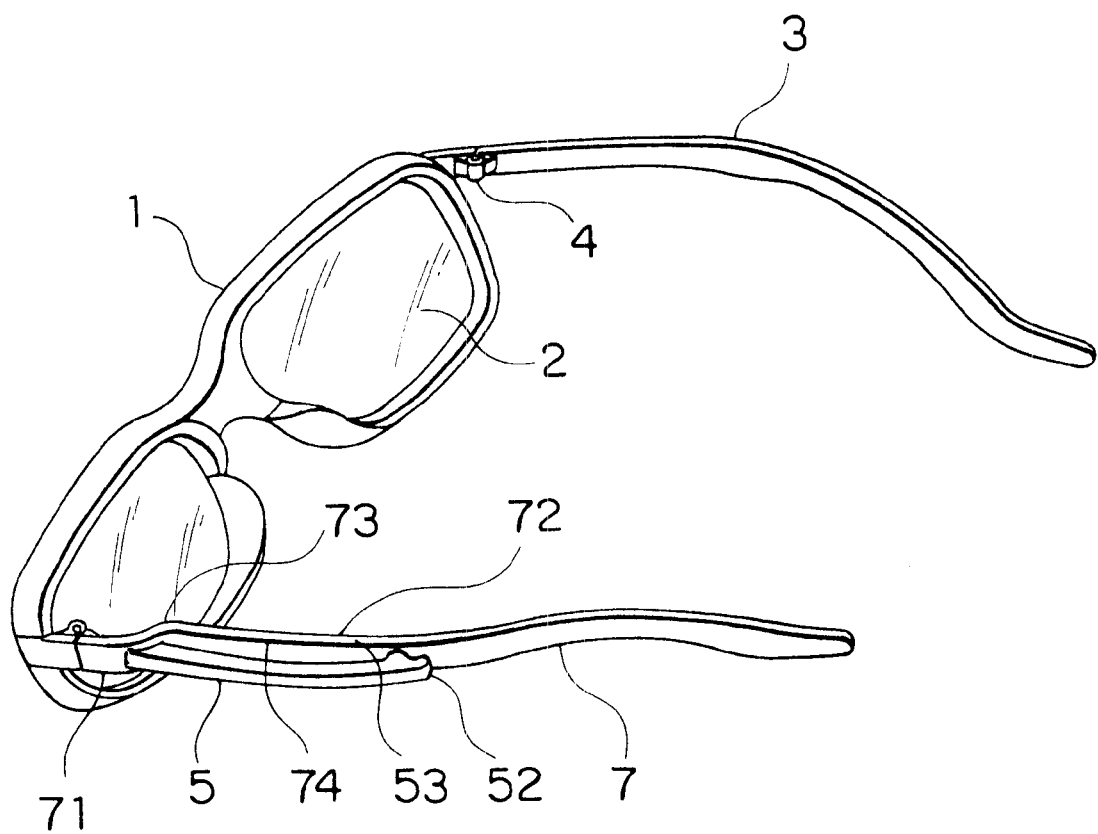
FIG. 13 is a perspective view of a pair of eyeglasses equipped with another embodiment of a frame according to the present invention.

FIG. 13 is a perspective view of a pair of eyeglasses equipped with another embodiment of a frame for eyeglasses according to the present invention. In this embodiment, one of the temple pieces of the frame (the left temple piece 7, for example) has an inwardly bent shape, and a clip 5 is mounted on the outer lateral surface of the temple piece 7. The left temple piece 7 includes a first region 71 which is connected to the lens frame 1 by a hinge 4, a second region 72 which is substantially parallel to the first region 71 but is offset with respect to the first region 71 in the widthwise direction of the frame towards the side of a wearer's head, and a third region 73 which extends diagonally between the first and second regions 71 and 72. The offset between the first and second regions 71 and 72 defines a shelf 74 on the outer lateral surface of the second region 72, and the clip 5 is mounted on the shelf 74. The other temple piece 3 is shown having a substantially straight shape like the temple pieces 3 in the preceding embodiments, but for symmetry, it may have a shape similar to the left temple piece 7. This structure reduces the amount by which the clip 5 extends outwards from the outer lateral surface of the temple piece 7, so it reduces the likelihood of the clip 5 inadvertently catching on objects, it decreases the overall size of the frame, and it decreases the visual obtrusiveness of the clip 5.

Figure 14:
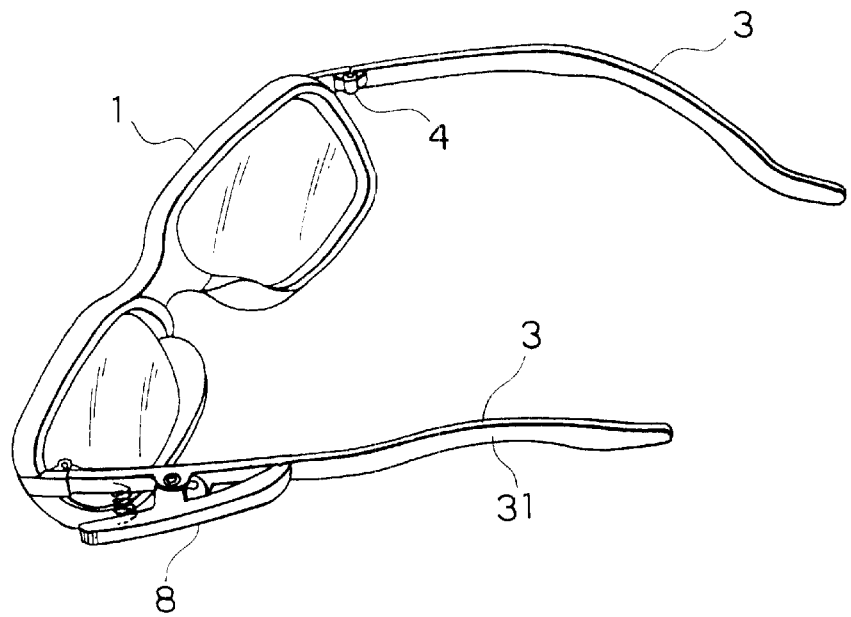
FIG. 14 is a perspective view of a pair of eyeglasses equipped with another embodiment of a frame for eyeglasses according to the present invention having a pivoting clip.
Figure 15:
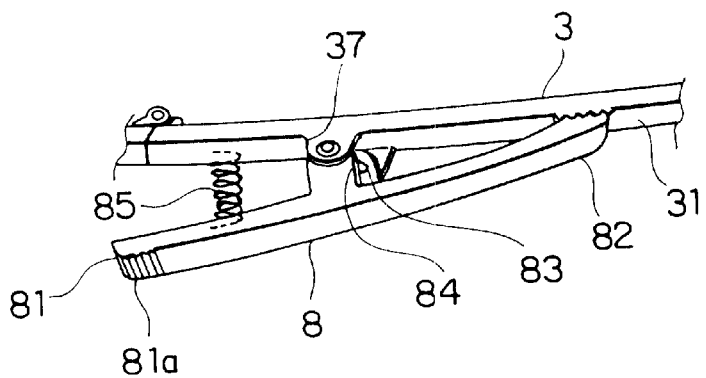
FIGS. 15 and 16 are enlarged perspective views of the clip of the embodiment of FIG. 14 in a closed state and an open state, respectively.
Figure 16:
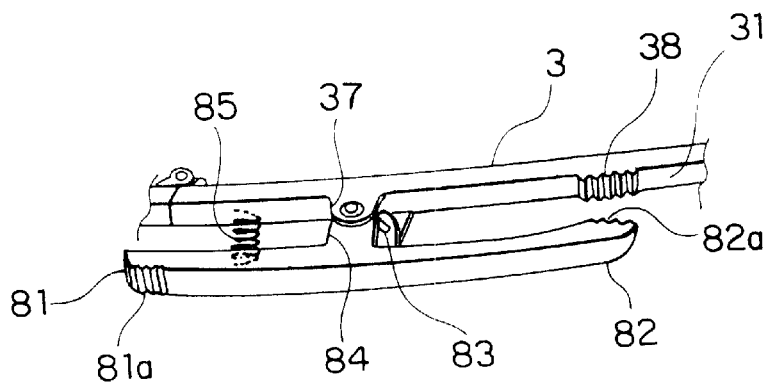

FIG. 14 is a schematic perspective view of a pair of eyeglasses equipped with another embodiment of a frame for eyeglasses according to the present invention, and FIGS. 15 and 16 are enlarged perspective views of a clip 8 of this embodiment in a closed state and an open state, respectively. In contrast to the clips 5 of the preceding embodiments, this clip 8 is a pivoting member which can pivot between its open and closed states. The size of the clip 8 relative to the size of other portions of the frame has been exaggerated in these figures for clarity. An actual clip 8 can be very small. The clip 8 includes a front end 81 and a rear end 82. Between its two ends, the clip 8 is pivotably connected to the temple piece 3 by a pivot pin 83 connected to two projecting lobes 84 formed on the clip 8 and two projecting lobes 37 formed on the temple piece 3. A biasing member is provided to bias the clip 8 to pivot about the pivot pin 83 towards its closed position. In the present embodiment, the biasing member comprises a helical compression spring 85 mounted between the temple piece 3 and the clip 8 on the forward side of the pivot pin 83. The clip 8 can be pivoted to its open position against the biasing force of the spring 85 by pressing with a finger on the front end 81 of the clip 8. This end 81 may be formed with ridges 81a or similar structure to make it easier to grip. Similarly, the opposing surfaces of the rear end 82 of the clip 8 and the temple piece 3 may be provided with ridges 82a and 38 or other surface roughing to enable them to better grip a pocket or other member between them. By choosing a strong spring for the biasing spring 85, the clip 8 can be made to exert a very strong gripping force so that the eyeglasses can be prevented from falling out of a pocket of an item of apparel to which they have been attached even when the wearer of the apparel is engaged in energetic physical activity, such as during exercise.

Figure 17:
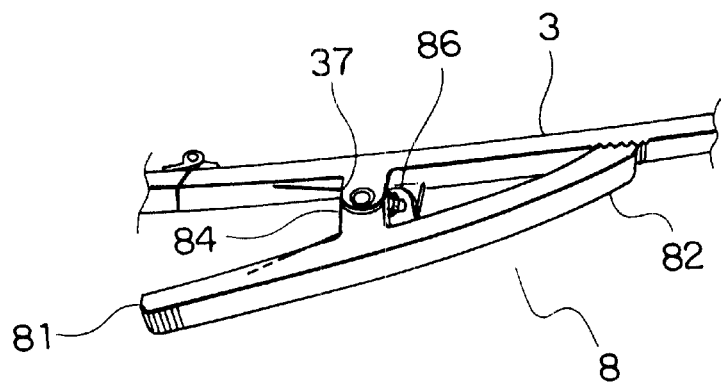
FIG. 17 is a perspective view of a clip of another embodiment of a frame for eyeglasses according to the present invention.

A biasing member for biasing the clip 8 to a closed position is not restricted to any particular structure. FIG. 17 is a perspective view of a clip 8 of another embodiment of the present invention which employs a helical torsion spring 86 such as is commonly used in clothes pins as a biasing member. The structure of this embodiment is otherwise the same as that of the preceding embodiment. A helical torsion spring 86 may enable the size of the clip 8 to be reduced, and it can reliably exert a biasing force on the clip 8 even when the wearer of the sunglasses presses on the front end 81 of the clip 8 at an angle.

Figure 18:
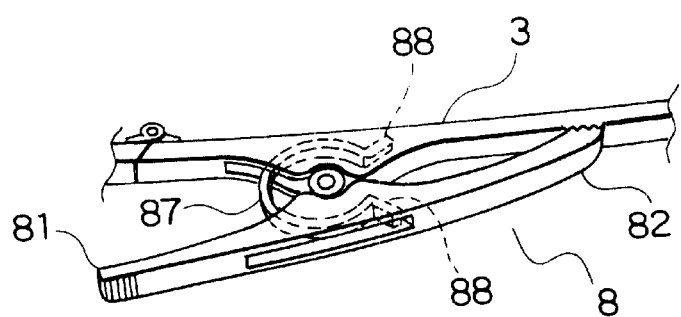
FIG. 18 is a perspective view of a clip of still another embodiment of a frame for eyeglasses according to the present invention.
Figure 19:
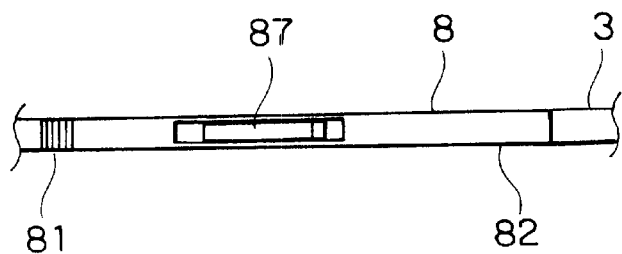
FIG. 19 is a side view of the clip of FIG. 18.

FIGS. 18 and 19 are a perspective view and a side elevation, respectively, of a clip 8 of another embodiment of the present invention. In this embodiment, a biasing member for biasing the clip 8 to a closed position comprises a spring 87 formed into the shape of a C, such as a spring formed from a thin, elastically deformable strip of metal or plastic. The spring 87 has two ends 88 which are bent away from each other. One end 88 engages the temple piece 3 and the other end 88 engages the clip 8 so that when the clip 8 is opened by pressing on its forward end 81, the two ends 88 will be forced away from each other and exert a biasing force in the direction to close the clip 8.

Figure 20:
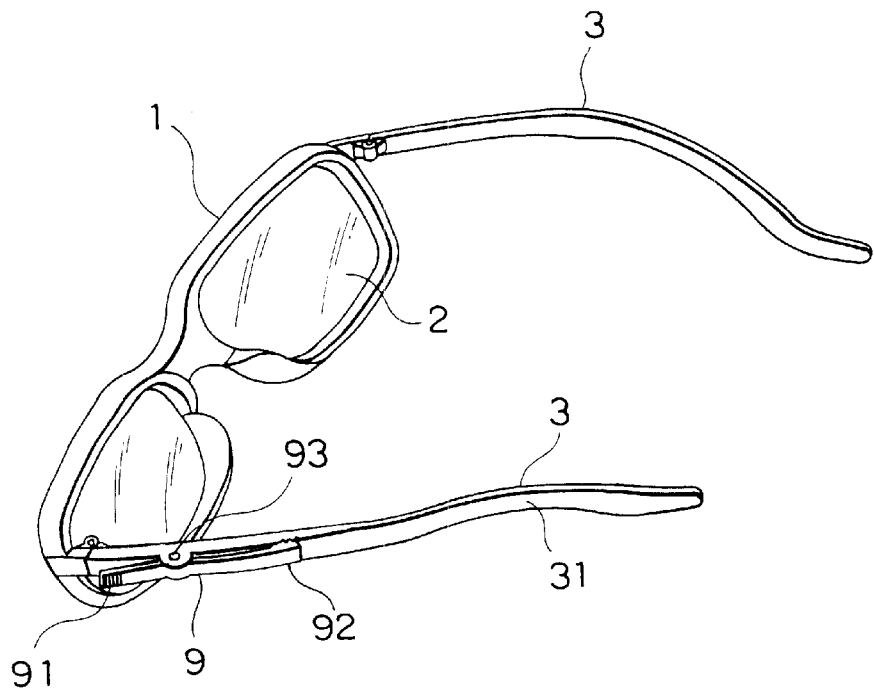
FIGS. 20 and 21 are perspective views of a pair of eyeglasses equipped with another embodiment of a frame according to the present invention with a clip of the frame in a closed state and an open state, respectively.
Figure 21:
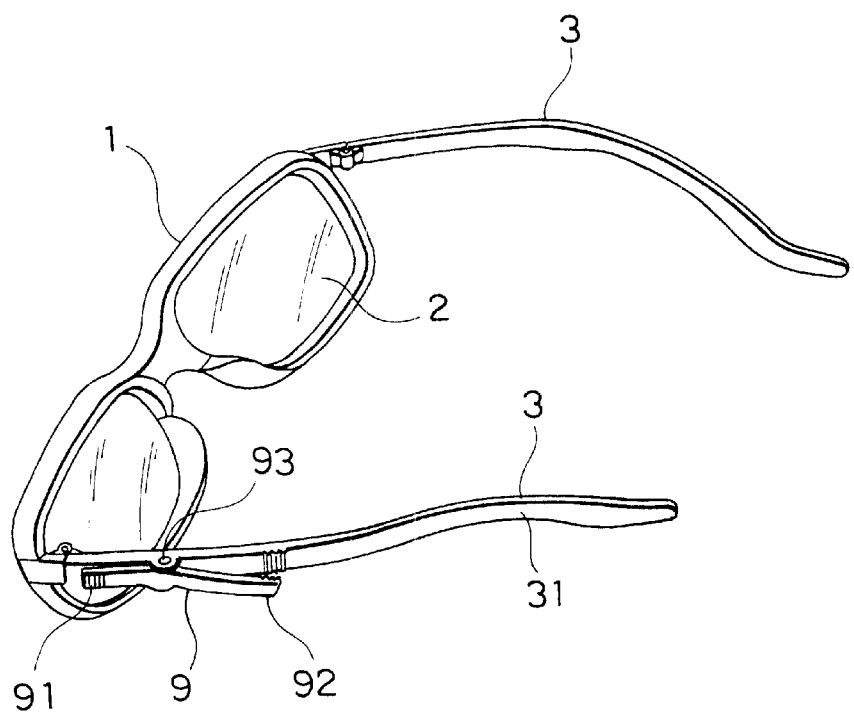

FIGS. 20 and 21 are schematic perspective views of a pair of eyeglasses equipped with another embodiment of a frame according to the present invention having a pivoting clip 9. FIG. 20 shows the clip 9 in a closed state, and FIG. 21 shows it pivoted to an open state. Like the clips 8 of the preceding embodiments, the clip 9 includes a front end 91, a rear end 92 for gripping a pocket or other member, and a pivot pin 93 where the clip 9 is pivotably mounted on the outer lateral surface 31 of a temple piece 3. The clip 9 is equipped with an unillustrated biasing member for biasing it to a closed position. The biasing member can have any desired structure, such as that of the springs 85–87 employed in the preceding embodiments. In order to decrease the amount by which the clip 9 protrudes from the temple piece 3, the portion of the clip 9 from the pivot pin 93 to the rear end 92 is made to extend substantially parallel to the temple piece 3, while the portion of the clip 9 from the pivot pin 93 to the front end 91 extends away from the outer lateral surface 31 of the temple piece 3. This clip 9 functions in the same way as the pivoting clips 8 of the preceding embodiments.

FIG. 22 is a perspective view of a portion a pair of eyeglasses equipped with another embodiment of a frame according to the present invention, FIG. 23 is a cutaway plan view of the left temple piece of this embodiment, and FIG. 24 is a cross-sectional view taken along line 24—24 of FIG. 23. Like the embodiment of FIG. 8, this embodiment includes a clip 5 disposed in a recess 39 formed in the outer lateral surface 31 of a temple piece 3 of the frame. The clip 5 and the recess 39 are shown as having a width which is less than the width of the temple piece 3, although it is also possible for the recess 39 to extend to one or both widthwise edges of the temple piece 3, and the clip 5 need not be narrower than the temple piece 3. The outer lateral surface of the clip 5 is either flush or recessed with respect to the portion of the outer lateral surface 31 of the temple piece 3 outside of the recess 39 except at the rear end 52 of the clip 5, which extends slightly outside of the recess 39 to provide a portion which can be readily grasped with the fingers or engaged by the edge of an object which is to be gripped by the clip 5. For example, the rear end of the clip 5 may have an outward projection or flare 54 which extends to the exterior of the recess 39. Because the clip 5 is disposed inside the recess 39 over most of its length, it produces almost no increase in the size of the frame, and it can be made visually unobtrusive. It is also possible to mount such a clip 5 on the inner lateral surface of either temple piece 3.

In FIGS. 5–24, a clip is shown mounted on only one of the temple pieces of a frame, but as described with respect to FIG. 4, a clip may be disposed on both temple pieces.

What is claimed is:

1. A frame for eyeglasses comprising:
a lens frame for holding a pair of lenses;
first and second temple pieces each having a front end connected to the lens frame and a rear end; and
a clip mounted on an inner lateral surface of the first temple piece and capable of gripping an item of apparel.

2. A frame as claimed in claim 1 wherein at least a portion of the clip is disposed in a recess in the inner lateral surface of the first temple piece.

3. A frame as claimed in claim 2 wherein the clip is disposed in the recess over an entire length of the clip.

4. A frame as claimed in claim 1 wherein the clip has a first end secured to the first temple piece and a second end capable of lateral movement relative to the first temple piece by elastic bending.

5. A frame as claimed in claim 1 including a clip mounted on an inner lateral surface of the second temple piece and capable of gripping an item of apparel.

6. A frame for eyeglasses comprising:
a lens frame for holding a pair of lenses;
first and second temple pieces each having a front end connected to the lens frame, the first temple piece having a first region connected to the lens frame, a second region which is substantially parallel to the first region and offset with respect to the first region in a widthwise direction of the frame towards a side of a wearer's head, and a third region having inner and outer lateral surfaces extending diagonally between the first and second regions; and
a clip capable of gripping an item of apparel having a front end mounted on the outer lateral surface of the third region, the clip extending rearwardly from its front end along the second region of the first temple piece.

7. A frame as claimed in claim 6 wherein the inner and outer lateral surfaces of the third region are substantially parallel to each other.

8. A frame as claimed in claim 6 wherein the first through third regions have a substantially constant thickness between the inner and outer lateral surfaces thereof.

9. A frame as claimed in claim 6 wherein the first region has inner and outer lateral surfaces substantially parallel to and offset in the widthwise direction of the frame with respect to inner and outer lateral surfaces, respectively, of the second region.

10. A frame for eyeglasses comprising:
a lens frame for holding a pair of lenses;
first and second temple pieces each having a front end connected to the lens frame, the first temple piece having a recess formed in a lateral surface thereof having a smaller width than the first temple piece and being spaced from widthwise edges of the first temple piece; and
a clip capable of gripping an item of apparel and having a first end secured to the first temple piece and a second end capable of lateral movement relative to the first temple piece by elastic bending, at least a portion of the clip being disposed in the recess.

11. A frame as claimed in the claim 10 wherein the clip is disposed in the recess over most of a length of the clip when the clip is not in use.

12. A frame as claimed in claim 11 wherein an outer lateral surface of the clip is flush or recessed with respect to an outer lateral surface of the first temple piece on either widthwise side of the recess along most of the length of the clip when the clip is not in use.

13. A frame as claimed in claim 12 wherein an extreme rear end of the clip extends to an exterior of the recess when the clip is not in use.

14. A frame as claimed in claim 13 wherein the extreme rear end of the clip has a flare extending to outside the recess.

15. A frame for eyeglasses comprising:

a lens frame for holding a pair of lenses;

first and second temple pieces each having a front end connected to the lens frame; and a clip pivotably mounted on a lateral surface of the first temple piece and pivotable between an open position in which a gripping portion of the clip for gripping an item of apparel is spaced from the lateral surface of the first temple piece and a closed position in which the gripping portion is pressed against the lateral surface of the first temple piece.

16. A frame as claimed in claim 15 wherein the clip includes a biasing member selected from a compression spring, a helical torsion spring and a C-shaped spring biasing the clip towards its closed position.

* * * * *